J. S. Lash,
Clothes Wringer,
No. 2,051. Reissued Aug. 15, 1865.
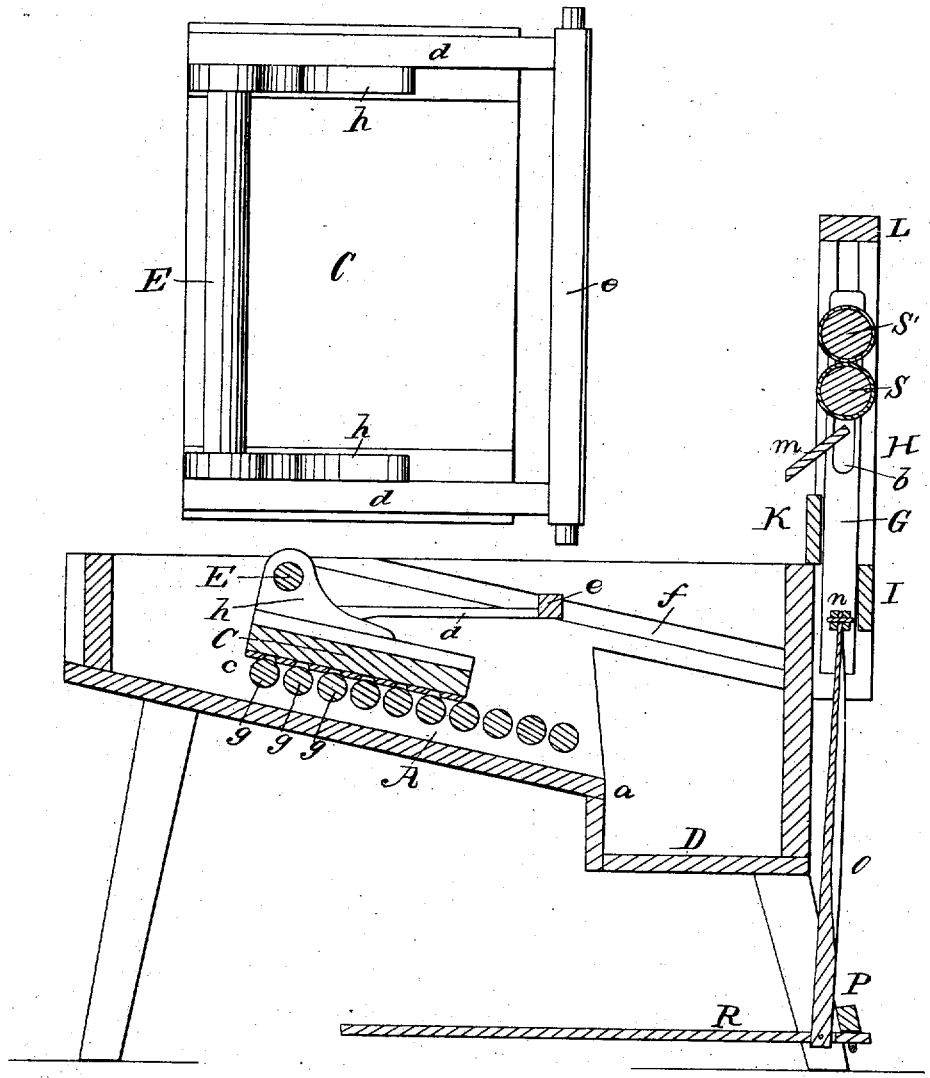
Witnesses;
Charles Alexander
S. C. Clayton
Inventor;
John S Lash
Per.
J. H. Alexander
Atty.
N. PETERS, PHOTO-LITHOGRAPHER, WASHINGTON, D. C.

UNITED STATES PATENT OFFICE.

JOHN S. LASH, OF PHILADELPHIA, PENNSYLVANIA.

WASHING-MACHINE.

Specification forming part of Letters Patent No. 36,658, dated October 14, 1862; Reissue No. 2,051, dated August 15, 1865.

DIVISION A.

*To all whom it may concern:*

Be it known that I, JOHN S. LASH, formerly of Carlisle, Cumberland county, Pennsylvania, but now of the city of Philadelphia, and State aforesaid, have invented a new and useful Improvement in Machines for Washing and for Wringing Clothes; and I do hereby declare the following to be a full, clear, and exact description of the same, reference being had to the accompanying drawings, making a part of this specification, in which—

Figure 1 represents a longitudinal vertical section through the machines. Fig. 2 represents a top plan of the wash-board, removed from the wash-box.

Similar letters of reference where they occur in the separate drawings denote like parts of the machine in both of the figures.

The nature of this part of my invention consists in the manner in which I arrange and guide and direct the reciprocating wash-board over the under rubbing-surfaces—viz., by the spring-arms that connect said rubbing-board with a cross bar whose ends move in grooves or slots made in the sides of the wash-box, and thus I avoid all upward projecting framing ordinarily used for guiding the rubbing-board.

To enable others skilled in the art to make and use my invention, I will proceed to describe the same with reference to the drawings.

The body of the machine consists of an oblong box, the end where the operator stands being of less depth, but increasing gradually in depth until it reaches the point *a*, and there the platform terminates in an abrupt descent, which forms one side of the tub D. Above the platform A there is arranged a series of rollers, *g*, at right angles with the sides of the box and having their bearings in its sides. These rollers extend from near the tub D to the point *c*, and are placed a short distance above the platform A and sufficiently far apart to revolve without contact.

The rubber C consists of a flat board, with slates thereon, and placed in line with the rolls lengthwise, so as to act in conjunction with the rolls for rubbing the clothes. These slats may be less than an inch in width, rounded at their edges to prevent their injuring the clothes, and placed at uniform distances apart. On the top of the rubber C two springs, *d*, of elastic wood, are secured, one near each end of the rubber. These springs extend backward and upward, and are fastened at their rear ends to a cross-bar, *e*, the ends of which bar are rounded so as to work freely in the guiding-grooves *f*, cut in the inner sides of the box, and at an angle or inclination corresponding with that of the platform A or of the rollers placed thereon.

E is a rung or handle secured to the rubbing-board by means of the raised blocks *h*, and is designed for working the rubbing-board backward and forward over the rollers *g*.

The springs *d* allow the rubbing-board to yield to the varying thicknesses of the clothes between the two washing-surfaces, while the cross-bar and grooves guide the rubbing-board as it is moved backward and forward.

At the rear end of the washing-machine I have represented and shown a wringing apparatus, but as this is a separate and distinct invention from the washing-machine, and has no necessary connection with it, being capable of a separate and independent use, and as it, moreover, constitutes the subject-matter of a separate application for a patent in connection with this application and division, I do not deem its description necessary here, it being shown by the drawings.

The cross-bar *e*, in addition to its guiding and directing the rubbing-board by means of its rounded ends working in the grooves *f*, also serves as a hinge or pivot, upon which the wash-board may be swung upward and backward out of the box when the clothes are to be removed, arranged, or inspected, and back again into working position when the washing is to be done.

Having thus fully described my invention, what I claim in this application, and desire to secure by Letters Patent, is—

In combination with the wash-box and its rolls or rubbing surface, a reciprocating wash-board connected by elastic or yielding arms *d* to a cross-bar, *e*, that moves and is guided in grooves *f* in the sides of the wash-box, as and for the purpose herein described and represented.

JOHN S. LASH.

Witnesses:
JOHN SPAHR,
M. HOLCOMB.